(No Model.) 5 Sheets—Sheet 1.
M. H. CAMERON & W. SNAPE.
MACHINE FOR CUTTING SECTIONS OF METALLIC BEAMS.
No. 515,746. Patented Mar. 6, 1894.
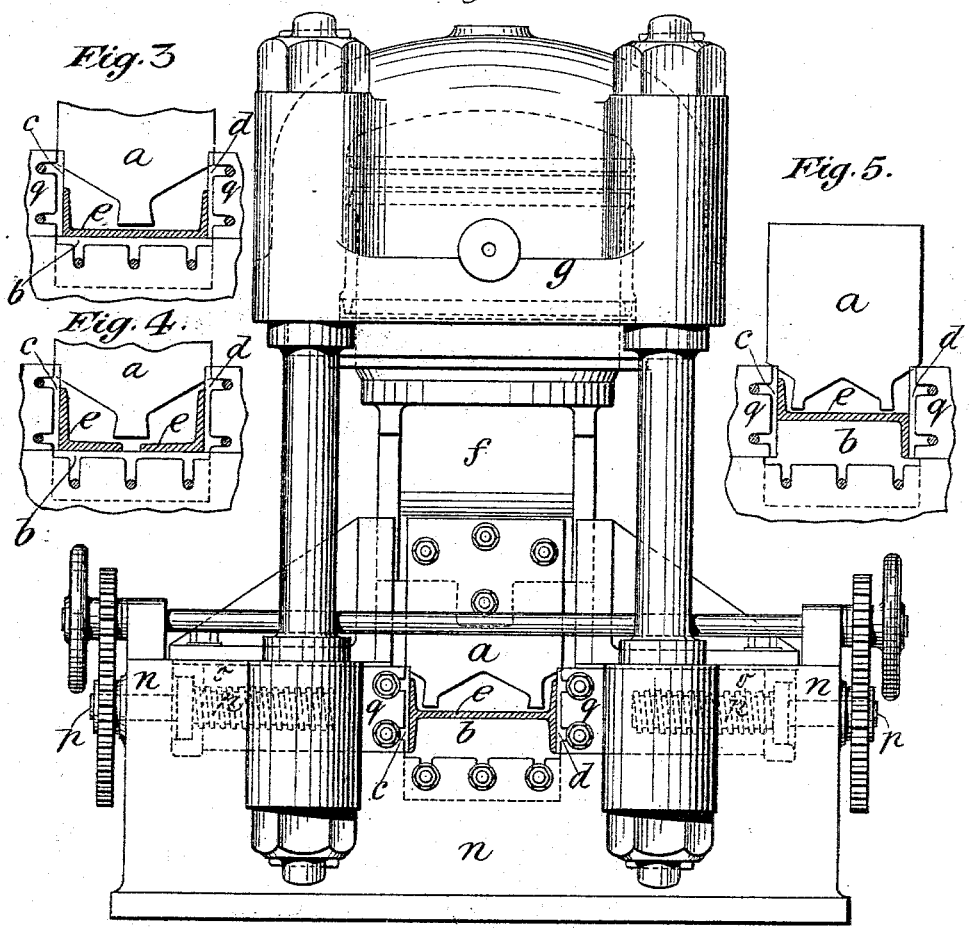
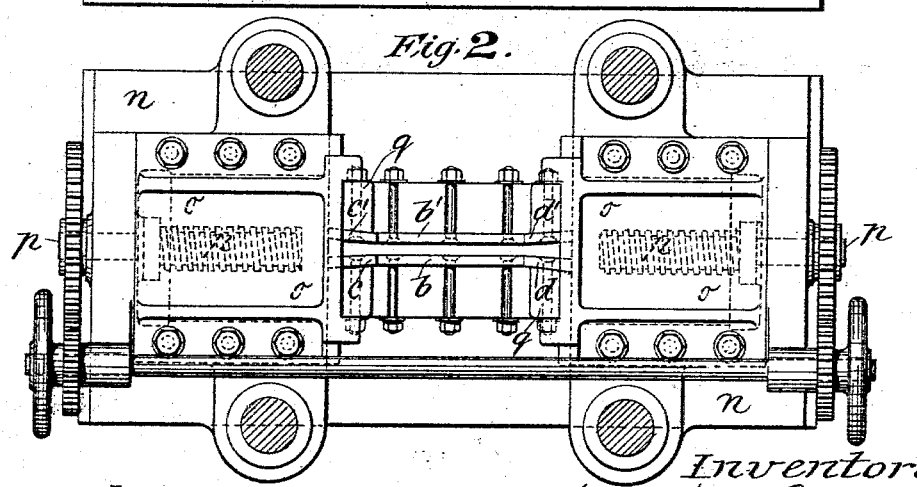
Witnesses:
E. B. Bolton
M. B. Barker
Inventors.
Moses Henry Cameron
William Snape
By Richards & Co.
their Attorneys.

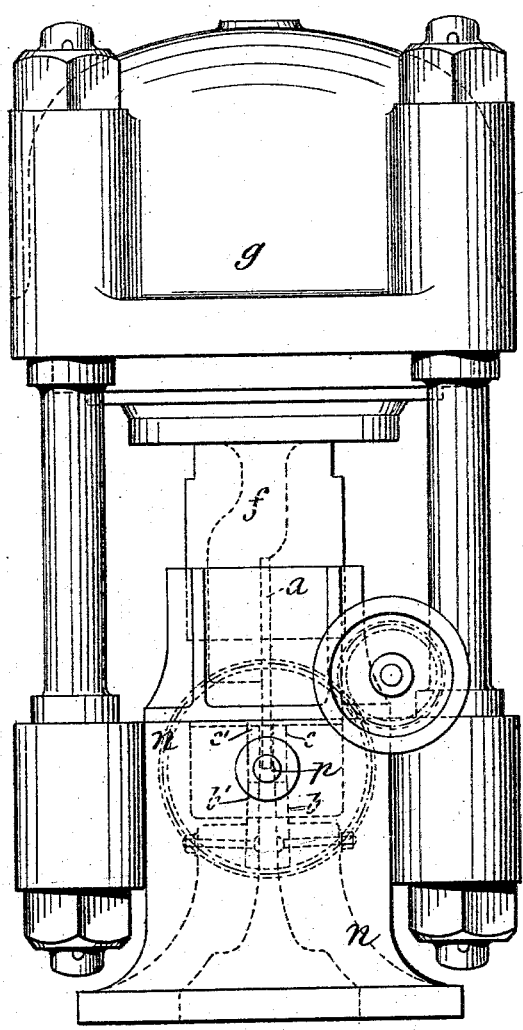

(No Model.) 5 Sheets—Sheet 3.

M. H. CAMERON & W. SNAPE.
MACHINE FOR CUTTING SECTIONS OF METALLIC BEAMS.

No. 515,746. Patented Mar. 6, 1894.

Witnesses.
Inventors:
Moses Henry Cameron
William Snape
By Richards & Co
their Attorneys.

THE NATIONAL LITHOGRAPHING COMPANY,
WASHINGTON, D. C.

(No Model.)  5 Sheets—Sheet 4.

M. H. CAMERON & W. SNAPE.
MACHINE FOR CUTTING SECTIONS OF METALLIC BEAMS.

No. 515,746.  Patented Mar. 6, 1894.

Witnesses:
E. B. Bolton
M. B. Barker

Inventors:
Moses Henry Cameron
William Snape
By Richards & Co.
their Attorneys.

THE NATIONAL LITHOGRAPHING COMPANY,
WASHINGTON, D. C.

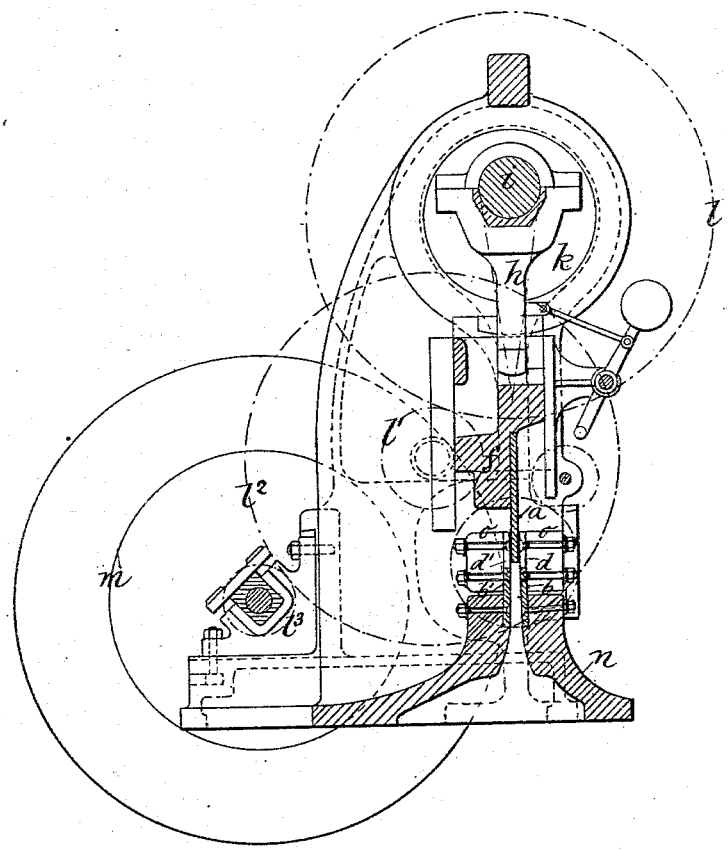

UNITED STATES PATENT OFFICE.

MOSES HENRY CAMERON AND WILLIAM SNAPE, OF SALFORD, ENGLAND.

MACHINE FOR CUTTING SECTIONS OF METALLIC BEAMS.

SPECIFICATION forming part of Letters Patent No. 515,746, dated March 6, 1894.

Application filed July 18, 1893. Serial No. 480,836. (No model.) Patented in England July 21, 1891, No. 12,349.

*To all whom it may concern:*

Be it known that we, MOSES HENRY CAMERON and WILLIAM SNAPE, subjects of the Queen of Great Britain, and residents of Salford, in the county of Lancaster, Kingdom of Great Britain, have invented new and useful Improvements in Machines for Cutting or Shearing Various Sections of Iron or Steel Bars, Beams, or Girders, (for which we have obtained a patent in Great Britain, No. 12,349, dated July 21, 1891,) of which the following is a specification.

This invention relates to improvements in machines for cutting or shearing various sections of iron or steel bars, beams, or girders, such as are used by ship-builders, roof and girder makers, and the like, and has principally for its object to provide means, whereby iron or steel bars, beams, or girders of "|___|" or other section can be cut or sheared at a right or other angle without altering or distorting the section of the piece cut off. We attain this object by the means illustrated in the accompanying drawings, in which—

Figure 7:
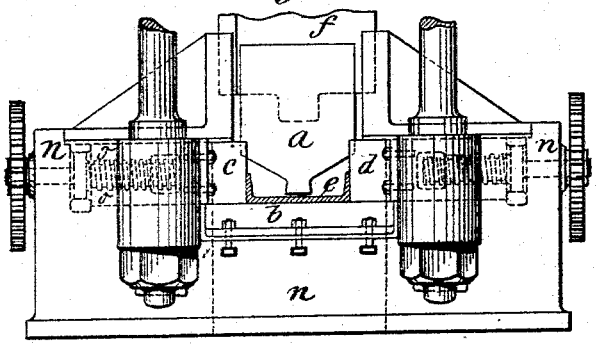
Figure 9:
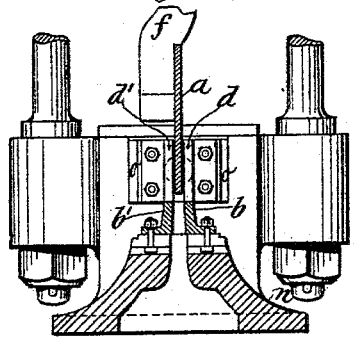
Figure 8:
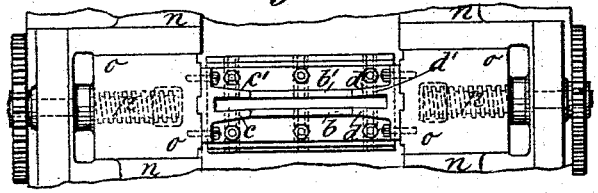
Figure 10:
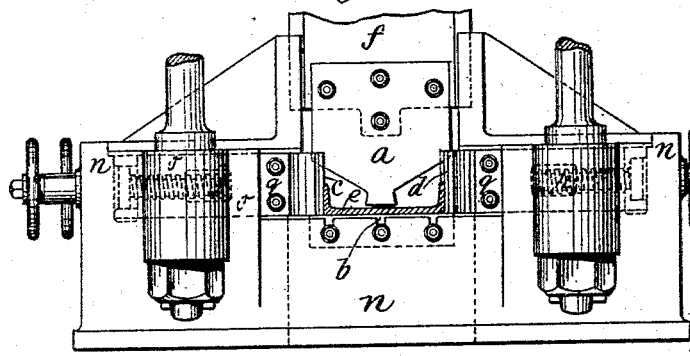
Figure 13:
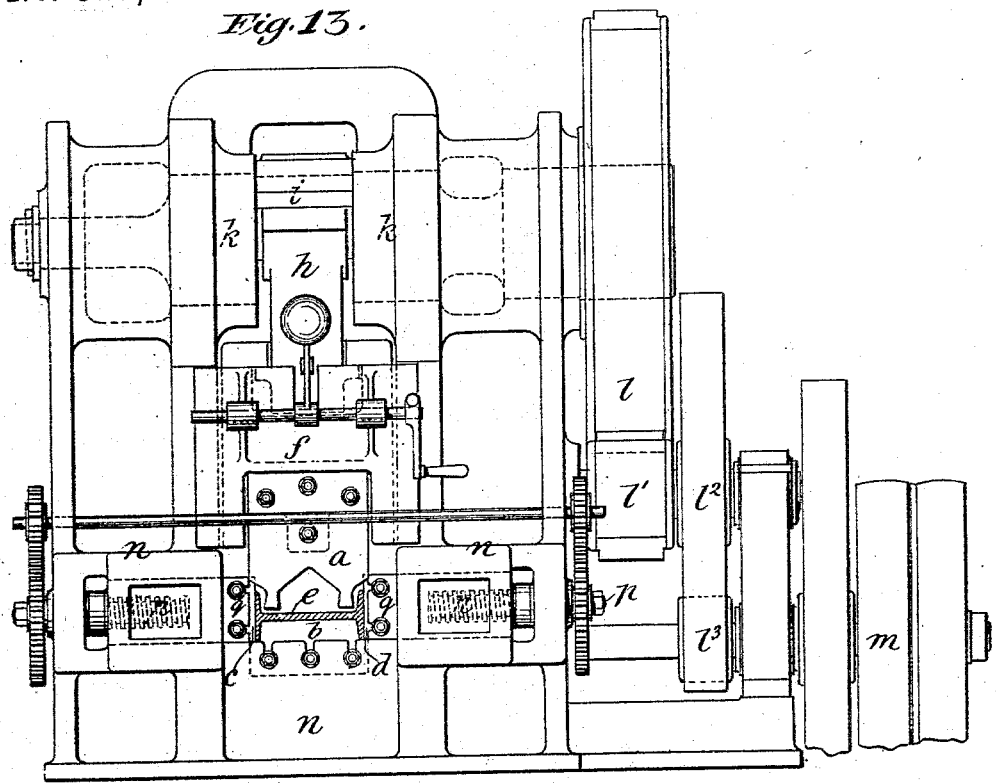
Figure 14:
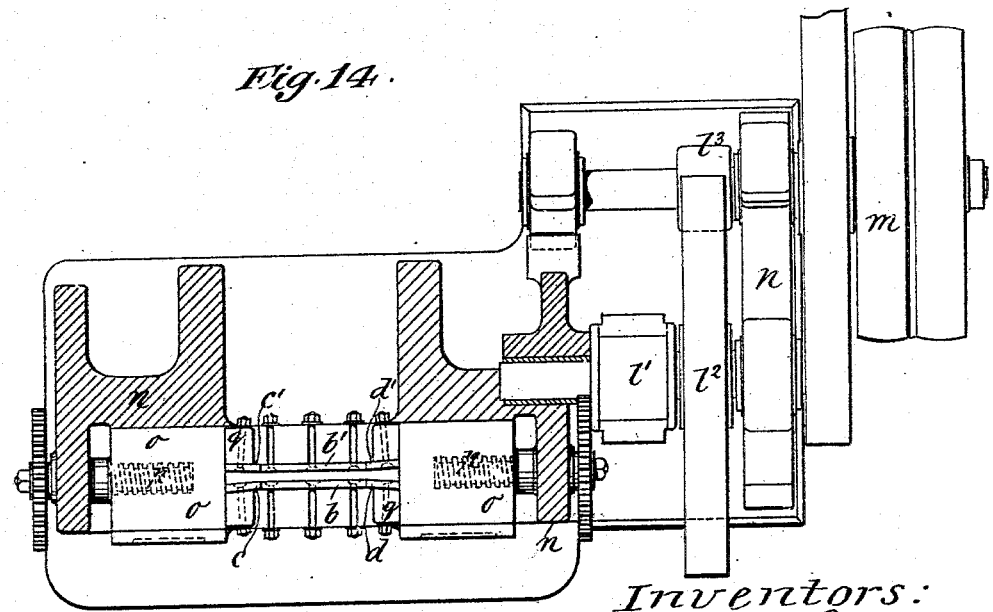

Figure 1, is a front view and Fig. 2 a sectional plan of Fig. 1, of a machine actuated by hydraulic power, and knife or shear blades arranged for cutting "I" sectioned iron or steel bars, beams, or girders. Figs. 3, 4 and 5 are front views of the knife or shear blades only, respectively arranged for channel, angle, and "Z" sectioned iron or steel. Fig. 6, is an end view of Fig. 1. Fig. 7, is a side view, Fig. 8 a sectional plan, and Fig. 9 a sectional end view of Fig. 7, showing the knife or shear arranged for cutting channel sectioned iron or steel. Fig. 10 is a front view, Fig. 11 a sectional plan and Fig. 12 a sectional end view of the knife or shear blades arranged for cutting channel sectioned iron or steel at other than a right angle. Fig. 13, is a front view of a machine actuated by means of gearing and showing the knife or shear blades arranged for "I" sectioned iron or steel. Fig. 14 is a sectional plan, and Fig. 15, a sectional end view of Fig. 13.

Similar letters refer to similar parts throughout the several views.

In carrying out our invention and referring to the figures generally, the improvements consist in the employment of a moving knife or shear blade $a$, having two cutting or shearing edges, operating in conjunction with three pairs of relatively stationary knives or shear blades $b$, $b'$, $c$, $c'$, $d$, $d'$, arranged "|___|" like. Three of the said knives or shear blades, namely $b$, $c$, $d$, are positioned in front of the knife or shear blade $a$ and the other three $b'$, $c'$, $d'$, at the back thereof, so as to form a die for the knife or shear blade $a$, which latter on moving downward cuts or shears a piece out of the "|___|" or other sectioned bar, beam, or girder $e$, equal to the full width of the section and the thickness of the knife or shear blade $a$.

The knife or shear blade $a$ may be carried by a slide $f$ connected to and actuated by a hydraulic ram $g$, see Figs. 1 and 3, or to a rocking lever or connecting rod $h$, see Figs. 13 to 15, moved by an eccentric or crank $i$ formed or fixed on the main shaft $k$, driven by spur wheel gearing $l$, $l'$, $l^2$, $l^3$, and actuated by either a pulley $m$ and belt or steam engine direct.

The three pairs of knives or shear blades $b$, $b'$, $c$, $c'$, $d$, $d'$, arranged "|___|" like, are supported by the body or frame $n$ of the machine, the lower pair $b$, $b'$, being fixed stationary and directly onto the body or frame $n$ of the machine, while the upper ones $c$, $c'$, $d$, $d'$, which are opposite each other, are fixed to slide blocks $o$ made adjustable on the body or frame $n$ by means of screws $p$, or other suitable mechanism, so as to adapt the machine to cut various sizes, *i. e.* widths and sections of iron or steel bars, beams, or girders $e$.

The knife or shear blades $b$, $b'$, $c$, $c'$, $d$, $d'$, may be formed separately from each other, as shown in (Figs. 10, 11, and 12), the knife or shear blades $b$, $b'$, being bolted to the respective part of the body or frame $n$ and the knife or shear blades $c$, $c'$, $d$, $d'$, to lugs $q$ formed at the front of the sliding blocks $o$, or the knife or shear blades $c$, $c'$, may be formed in one part, and also the blades $d\,d'$ in one piece as shown in (Figs. 7, 8, and 9), in which case the lugs $q$ are dispensed with.

Figure 12:
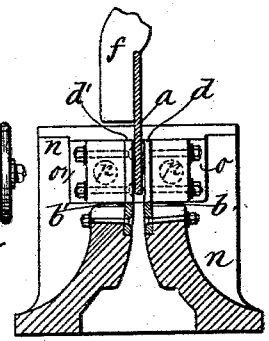
Figure 11:
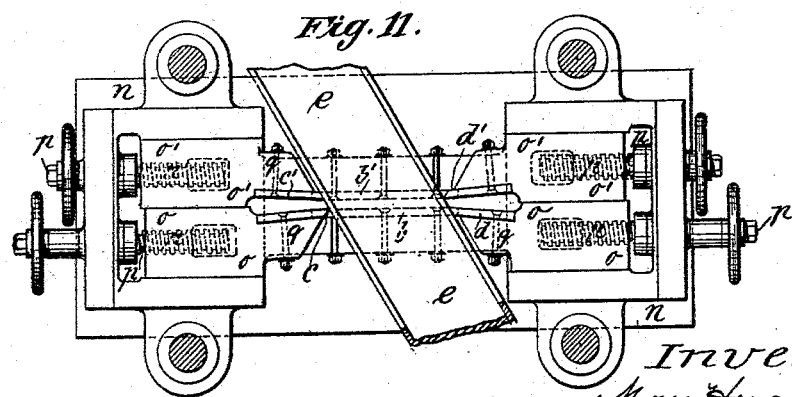

For cutting iron or steel bars, beams, or girders $e$ at a right angle, the vertical cutting edges of the knife or shear blades $b$, $b'$, $c$, $c'$, $d, d'$, (Figs. 7, 8, and 9,) are positioned at a right angle behind each other, while for cutting at other than a right angle, the knife or shear blades $c, c', d, d'$, are displaced according to the angle at which it is desired to cut the iron or steel bar, beam, or girder $e$, as shown in (Figs. 10, 11, and 12).

In order to facilitate the displacement of the knife or shear blades $c, c', d, d'$, according to requirements, they are fixed to separate blocks $o, o'$, each having its own screw $p$ for adjustment.

The arrangement of knife or shear blades described forms practically a punch and die and enables them to cut various sections of iron or steel bars, beams, or girders $e$, so as not to distort the section or cut ends and thus retain the section perfect.

It will be evident that the described knife or shear blades may also be arranged inclined or vertical, or that they may be duplicated and worked from either one or two eccentrics or cranks $i$ and that the knife or shear blade $a$ can be stationary, while the three pairs of knife or shear blades $b, b', c, c', d, d'$, are caused to be moved.

What we claim as our invention, and desire to secure by Letters Patent, is—

1. In combination, the pair of bottom knives $b\ b'$ arranged opposite each other with a space between, the pair of opposing knives $c, c'$ arranged at one end of the knives $b, b'$ and the pair of opposing knives $d\ d'$ arranged at the other end of the knives $b, b'$ said pairs $c\ c'$—$d, d'$ forming side cutters, and the shear blade $a$ arranged to enter the space between the pairs of knives, substantially as described.

2. In combination, the pairs of bottom knives $b\ b'$ arranged opposite each other with a space between, the pair of opposing side knives $c\ c'$ at one end of the knives $b\ b'$, the pair of opposing side knives $d\ d'$ at the other end of the bottom knives $b\ b'$, the means for adjusting the side knives lengthwise of the bottom knives and the shear blade $a$ arranged to enter the space between the pair of knives, substantially as described.

3. In combination, the opposing bottom knives $b\ b'$, the pairs of side knives $c\ c', d\ d'$ at the ends of the bottom knives, the means for adjusting each of the knives $c\ c'\ d\ d'$ independently and the shear blade $a$ arranged to enter between the knives, substantially as described.

In witness whereof we have hereunto set our hands in presence of two witnesses.

MOSES HENRY CAMERON.
WILLIAM SNAPE.

Witnesses:
ALFRED BOSSHARDT,
STANLEY E. BRAMALL.